(12) United States Patent  (10) Patent No.: US 9,960,807 B2
Park et al.  (45) Date of Patent: May 1, 2018

(54) DEVICE FOR DECREASING INTERFERENCE IN CABLE BUNDLE AND METHOD THEREOF

(71) Applicant: KT CORPORATION, Gyeonggi-do (KR)

(72) Inventors: Hyung-Jin Park, Seoul (KR); Kwangyeol Yoon, Seoul (KR); No Wook Park, Gyeonggi-do (KR); In-Taek Jeong, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 0 days. days.

(21) Appl. No.: 15/177,453

(22) Filed: Jun. 9, 2016

(65) Prior Publication Data

US 2016/0365895 A1 Dec. 15, 2016

(30) Foreign Application Priority Data

Jun. 9, 2015 (KR) .................. 10-2015-0081398

(51) Int. Cl.
*H04L 25/49* (2006.01)
*H04B 3/487* (2015.01)
*H04B 3/32* (2006.01)
*H04B 3/06* (2006.01)

(52) U.S. Cl.
CPC .............. *H04B 3/487* (2015.01); *H04B 3/06* (2013.01); *H04B 3/32* (2013.01)

(58) Field of Classification Search
CPC ......... H04B 3/32; H04B 7/0417; H04M 3/34; H04L 2025/03414
See application file for complete search history.

(56) References Cited

U.S. PATENT DOCUMENTS

2009/0245335 A1* 10/2009 Fang ................... H04B 3/32 375/222
2010/0135482 A1 6/2010 Jagannathan et al.
2012/0281738 A1 11/2012 Clausen et al.
(Continued)

FOREIGN PATENT DOCUMENTS

JP 2010-506497 A 2/2010
KR 10-2006-0088602 A 8/2006
(Continued)

*Primary Examiner* — David S Huang
(74) *Attorney, Agent, or Firm* — IP Legal Services, LLC

(57) ABSTRACT

Disclosed is a device and method for decreasing interference in a cable bundle. The device includes a plurality of concentration devices, an interference measurer, and a concentration device. Each concentration device accesses an uplink and provides a network service to a terminal through a cable bundle in an access section. An interference measurer is connected between the cable bundle and the terminal. The interference measure is configured to measure an interference signal by measuring a signal transmitted to the terminal through the cable bundle, calculate an interference coefficient for generating a quasi-interference signal, and transmit the same to the concentration devices. The concentration devices is configured to calculate an additional signal for offsetting an interference signal by using the interference coefficient, add the additional signal to the original signal, and transmit the additional signal to the cable bundle.

7 Claims, 9 Drawing Sheets

(56) References Cited

U.S. PATENT DOCUMENTS

| | | |
|---|---|---|
| 2013/0215951 A1 | 8/2013 | Nuzman |
| 2013/0229905 A1* | 9/2013 | Schenk .................... H04B 3/32 370/201 |
| 2014/0294054 A1* | 10/2014 | Kim ........................ H04B 3/32 375/225 |
| 2015/0124859 A1* | 5/2015 | Cuzzola ............... H04M 11/062 375/222 |
| 2016/0301447 A1 | 10/2016 | Park et al. |

FOREIGN PATENT DOCUMENTS

| | | |
|---|---|---|
| KR | 10-2010-0130907 A | 12/2010 |
| KR | 10-1145830 B1 | 5/2012 |
| KR | 10-1373082 B1 | 3/2014 |
| KR | 10-2014-0117553 A | 10/2014 |
| KR | 10-1474520 B1 | 12/2014 |

* cited by examiner

DEVICE FOR DECREASING INTERFERENCE IN CABLE BUNDLE AND METHOD THEREOF

CROSS-REFERENCE TO RELATED APPLICATION

This application claims priority to and the benefit of Korean Patent Application No. 10-2015-0081398 filed in the Korean Intellectual Property Office on Jun. 9, 2015, the entire contents of which are incorporated herein by reference.

BACKGROUND OF THE INVENTION (a) Field of the Invention

The present disclosure relates to a device and method for decreasing interference in a cable bundle.

(b) Description of the Related Art

An x digital subscriber line (xDSL) using cables and a fiber to the x (FTTx) using optic cables are representative systems for providing a 100 mega-based high-speed Internet service.

Recently, Internet service providers (ISPs) have been competing with each other so as to overcome the speed limit and provide a faster speed, such as the giga-level Internet. For example, the FTTx is the representative service providing system.

Technologies for providing giga-level speeds using existing lines as well as the FTTx have been developed and the services have been prepared.

Many studies have conducted for overcoming problems, such as speed deterioration issues with respect to interference, particularly, crosstalk, when the services are provided through lines. However, the crosstalk still exists.

Particularly, the access network uses a cable bundle wrapped with a plurality of lines in order to accommodate many subscribers. The cable bundle generates interference. Such interference becomes an important factor for the ISPs because the ISPs must provide guaranteed speeds using the cable bundle.

Therefore, there is a demand for methods for controlling or decreasing interference occurring in the cable bundle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present disclosure has been made in an effort to provide a device and method for decreasing interference in a cable bundle for decreasing interference generated between a concentration device and a terminal sharing a cable bundle in an access section.

An exemplary embodiment of the present disclosure provides a device for decreasing interference that includes: a plurality of concentration devices, an interference measurer. Each of conctranction devices is connected to an uplink and configured to provide a network service to a terminal through a cable bundle in an access section. The interference measurer is connected between the cable bundle and the terminal and configured to measure an interference signal occurring between original signals by measuring a signal transmitted to the terminal from the plurality of concentration devices through the cable bundle, calculate an interference coefficient for generating a quasi-interference signal for offsetting the measured interference signal, and transmit the same to the concentration devices. The concentration devices are configured to calculate an additional signal for offsetting an interference signal generated in the cable bundle by using the interference coefficient provided by the interference measurer, add the additional signal to the original signal to be transmitted to the terminal, and transmit the additional signal to the cable bundle.

Here, the concentration device is configured to calculate a quasi-interference signal by using the original signal and the interference coefficient, and is configured to generate the additional signal by using a quasi-interference signal transmitted from a second concentration device for influencing a line of the second concentration device for transmitting a signal.

The concentration device includes: a quasi-interference signal calculator configured to calculate a quasi-interference signal for multiplying the original signal by the interference coefficient transmitted from the interference measurer and transmit the same to the second concentration device; an additional signal calculator configured to calculate an additional signal by using the quasi-interference signal transmitted from the second concentration device; and a signal processor configured to add the additional signal calculated by the additional signal calculator to the original signal and transmit the same to the cable bundle.

The additional signal calculator is configured to calculate the additional signal by adding the quasi-interference signals transmitted by the second concentration device.

The additional signal is phase-inverted from the original signal by about 180 degrees.

Another embodiment of the present disclosure provides a method for decreasing, by a device, interference in a cable bundle. The method may include: measuring an interference signal generated between signals by measuring signals transmitted to a terminal from a plurality of concentration devices through a cable bundle, calculating an interference coefficient for generating a quasi-interference signal for offsetting the measured interference signal, and transmitting the same to the plurality of concentration devices; allowing the concentration devices to calculate an additional signal for offsetting an interference signal generated in the cable bundle by using the interference coefficient with an original signal to be transmitted to the terminal; and transmitting a final signal calculated by adding the additional signal to the original signal to be transmitted to the terminal through the cable bundle.

Here, the calculating of an additional signal includes: allowing the concentration devices to generate a quasi-interference signal by multiplying the interference coefficient by the original signal and transmit the same to a second concentration device; and calculating the additional signal by adding the quasi-interference signal transmitted by the second concentration device.

Yet another embodiment of the present disclosure provides a device for decreasing interference. The device may include a plurality of concentration devices each connected to an uplink and configured to provide a network service to a terminal through a cable bundle in an access section; and an interference measurer connected between the cable bundle and the terminal and configured to measure a signal transmitted to the terminal from the plurality of concentration devices through the cable bundle to measure an interference signal occurring between original signals, calculate an interference coefficient for generating a quasi-interference signal for offsetting the measured interference signal, and transmit the same to the concentration devices, wherein the plurality of concentration devices is configured to calculate a quasi-interference signal by using the interference coefficient transmitted by the interference measurer, and transmit the same to a concentration device accessing an unused line, and the concentration device connected to the unused line generates a final signal for offsetting an interference signal generated in the cable bundle by using the quasi-interference signal transmitted by the plurality of concentration devices and transmits the same through the cable bundle.

Here, the concentration device multiplies the interference coefficient by the original signal to calculate the quasi-interference signal.

Further, the concentration device includes: a signal processor connected between the uplink and the cable bundle and configured to perform signal processing so as to transmit a signal; and a quasi-interference signal calculator configured to calculate the quasi-interference signal by multiplying the interference coefficient transmitted by the interference measurer by an original signal transmitted through the signal processor and transmitting the same to the concentration device accessing the unused line.

The concentration device accessing the unused line includes: a quasi-interference signal receiver configured to receive a quasi-interference signal from the plurality of concentration devices; and a signal processor configured to add the quasi-interference signals from the quasi-interference signal receiver and calculate the final signal.

Yet another embodiment of the present disclosure provides a method for decreasing, by a device, interference generated in a cable bundle. The method may include: measuring an interference signal generated between signals by measuring signals transmitted to a terminal from a plurality of concentration devices through a cable bundle, calculating an interference coefficient for generating a quasi-interference signal for offsetting the measured interference signal, and transmitting the same to the plurality of concentration devices; allowing the plurality of concentration devices to use the interference coefficient with an original signal to be transmitted to the terminal to calculate a quasi-interference signal, and transmit the same to the concentration device accessing the unused line; and allowing the concentration device accessing the unused line to use the quasi-interference signal transmitted by the concentration devices, generate a final signal for offsetting an interference signal generated in the cable bundle, and transmit the same through the cable bundle.

Here, the quasi-interference signal is calculated by multiplying the interference coefficient by the original signal, and the final signal is generated when the concentration device accessing the unused line adds quasi-interference signals transmitted by the concentration devices.

According to embodiments of the present disclosure, the interference occurring between the concentration device and the terminal sharing a same cable bundle in the access section may be decreased.

Further, the speed quality of the network service provided through the cable bundle may be accordingly improved.

DETAILED DESCRIPTION OF THE EMBODIMENTS

Figure 1:
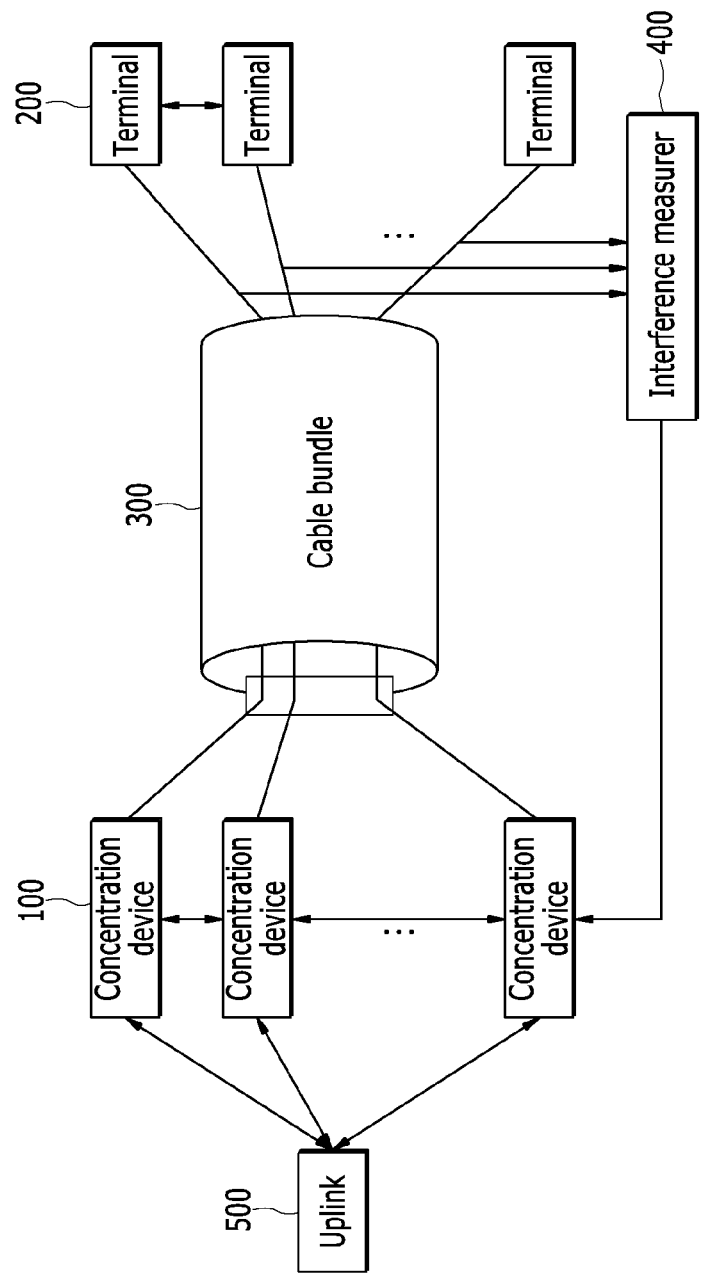
FIG. 1 shows an interference decreasing device in a cable bundle according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

A device for decreasing interference in a cable bundle according to an exemplary embodiment of the present disclosure will be described with reference to accompanying drawings.

A device and method for decreasing interference in a cable bundle according to an exemplary embodiment of the present disclosure will now be described.

FIG. 1 shows a device for decreasing interference in a cable bundle according to an exemplary embodiment of the present disclosure.

As shown in FIG. 1, the device 10 for decreasing interference in a cable bundle includes a concentration device (e.g., concentrator) 100, a terminal 200, a cable bundle 300, and an interference measurer 400.

The concentration device 100 provides a home network service in an access network 10. The concentration device 100 is disposed on a side of a network operator and connected to an uplink 500 connected to a high level communication device.

The terminal 200 is a terminal device of the concentration device 100. The terminal 200 is physically connected to the concentration device 100 through the cable bundle 300, and the terminal 200 is disposed on a side of a user.

The cable bundle 300 provides physical connection between at least one concentration device 100 and a plurality of terminals 200. The cable bundle 300 is provided as a plurality of bound cables. For example, the cable bundle 300 is configured with equal to or greater than twenty-four pairs of bundled cables in a part of the access network.

The interference measurer 400 is disposed between the cable bundle 300 and the terminal 200. The interference measurer 400 measures a signal transmitted to the terminal 200 from the concentration device 100 through the cable bundle 300. The interference measurer 400 measures an interference signal mutually generated between original signals, calculates an interference coefficient generating a quasi-interference signal for offsetting the interference signal, and transmits it to the concentration device 100.

Therefore, the concentration device 100 applies the interference coefficient transmitted by the interference measurer 400 to the original signal transmitted by the uplink 500 to generate a quasi-interference signal and transmit the same to the concentration device 100, and a second concentration device 100 adds a quasi-interference signal transmitted by a third concentration device 100 influencing a line of the second concentration device 100 to the original signal transmitted by the uplink 500 and transmits the same to the terminal 200 through the cable bundle 300.

In another way, the concentration device 100 applies the interference coefficient transmitted by the interference measurer 400 to the original signal transmitted by the uplink 500 to generate a quasi-interference signal and transmit the same to the concentration device 100 corresponding to an unused line, and the concentration device 100 corresponding to the unused line transmits the received quasi-interference signal to the cable bundle 200 through the unused line.

Here, the interference signal caused by the original signal may be offset when a phase of the quasi-interference signal is phase-inverted from the original signal by about 180 degrees.

As described, in an exemplary embodiment of the present disclosure, two methods may be used to decrease the interference signal generated in the cable bundle 300.

Such methods will be described in further detail with reference to drawings.

Figure 2:
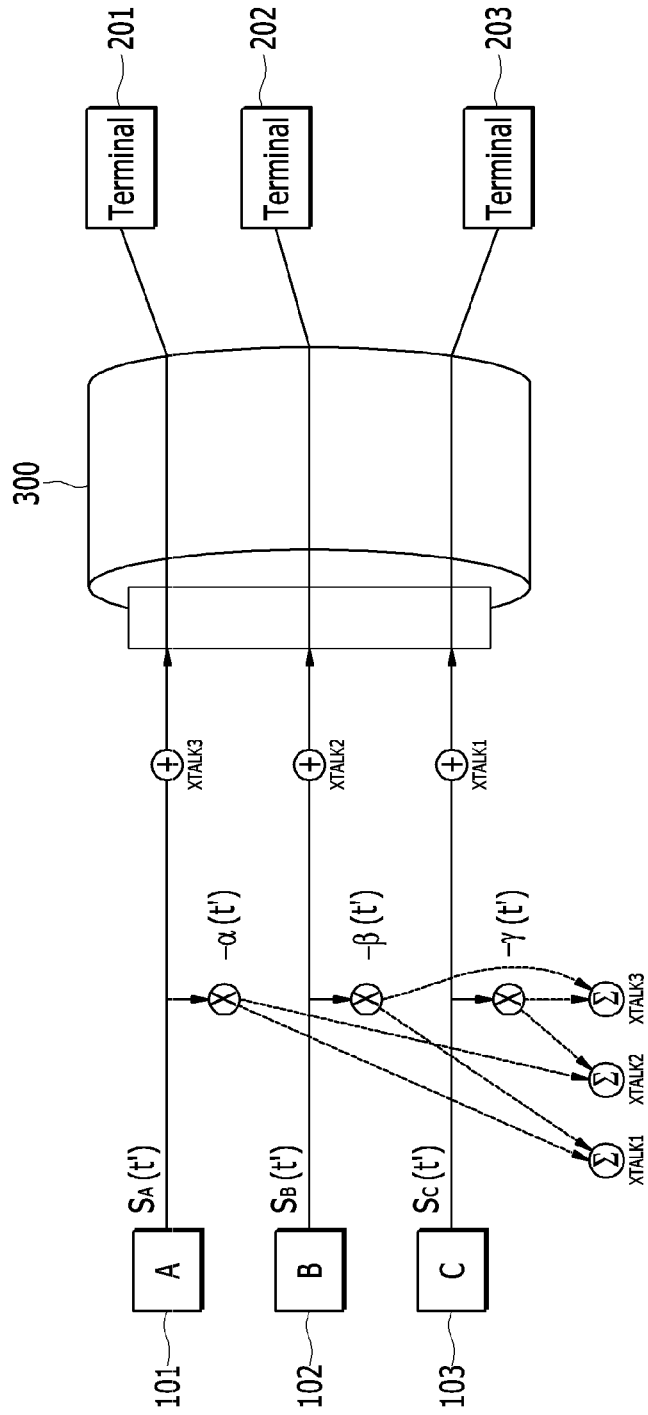
FIG. 2 shows an example of a method for decreasing interference in a cable bundle according to an exemplary embodiment of the present disclosure.

FIG. 2 shows a method for decreasing interference in a cable bundle according to an exemplary embodiment of the present disclosure.

Referring to FIG. 2, for ease of description, the method will be described with a communication environment including three concentration devices A (101), B (102), and C (103) respectively connected to three terminals 201, 202, and 203 through the cable bundle 300.

When original signals transmitted to the terminals 201, 202, and 203 from the concentration devices A (101), B (102), and C (103) are $S_A(t')$, $S_B(t')$, and $S_C(t')$, and the original signals are transmitted through the cable bundle 300, the interference coefficients measured and calculated by the interference measurer 400 are $-\alpha(t')$, $-\beta(t')$, and $-\gamma(t')$.

Therefore, the quasi-interference signal for the concentration device A (101) represents a signal of the product of the original signal and $-\alpha(t')$, the quasi-interference signal for the concentration device B (102) represents a signal of the product of the original signal and $-\beta(t')$, and the quasi-interference signal for the concentration device C (103) represents a signal of the product of the original signal and $-\gamma(t')$. The concentration device A (101) sums the quasi-interference signals of the other concentration devices B (102) and C (103) influencing the original signal of the concentration device A (101), adds the summed signals to the original signal of the concentration device A (101), and transmits the added signals through the cable bundle 300 as a final signal.

Further, the concentration device B (102) sums the quasi-interference signals of the other concentration devices A (101) and C (103) influencing the original signal of the concentration device B (102), adds the summed signals to the original signal of the concentration device B (102), and transmits the added signals through the cable bundle 300 as a final signal.

The concentration device C (103) sums the quasi-interference signals of the other concentration devices A (101) and B (102) influencing the original signal of the concentration device C (103), adds the summed signals to the original signal of the concentration device C (103), and transmits the added signals through the cable bundle 300 as a final signal.

For example, in FIG. 2, assuming that the concentration devices A (101), B (102), and C (103) transmit the same original signals $S_A(t')$, $S_B(t')$, and $S_C(t')$, the concentration device A (101) adds the summation signal XTALK3=$S_B(t')*(-\beta(t'))+S_C(t')*(-\gamma(t'))$ of the quasi-interference signal $S_B(t')*(-\beta(t'))$ of the concentration device B (102) and the quasi-interference signal $S_C(t')*(-\gamma(t'))$ of the concentration device C (103) to the original signal $S_A(t')$, and transmits the added signals to the terminal 201 through the cable bundle 300.

That is, the final signal ($F_A(t')$) transmitted to the terminal 201 from the concentration device A (101) through the cable bundle 300 is as follows.

$$F_A(t')=S_A(t')+S_B(t')*(-\beta(t'))+S_C(t')*(-\gamma(t'))$$

The concentration device B (102) adds the summation signal XTALK2=$S_A(t')*(-\alpha(t'))+S_C(t')*(-\gamma(t'))$ of the quasi-interference signal $S_A(t')*(-\alpha(t'))$ of the concentration device A (101) and the quasi-interference signal $S_C(t')*(-\gamma(t'))$ of the concentration device C (103) to the original signal $S_B(t')$, and transmits the added signals to the terminal 202 through the cable bundle 300.

That is, the final signal ($F_B(t')$) transmitted to the terminal 202 from the concentration device B (102) through the cable bundle 300 is as follows.

$$F_B(t')=S_B(t')+S_A(t')*(-\alpha(t'))+S_C(t')*(-\gamma(t'))$$

In a like manner, the concentration device C (103) adds the summation signal XTALK1=$S_A(t')*(-\alpha(t'))+S_B(t')*(-\beta(t'))$ of the quasi-interference signal $S_A(t')*(-\alpha(t'))$ of the concentration device A (101) and the quasi-interference signal $S_B(t')*(-\beta(t'))$ of the concentration device B (102) to the original signal $S_C(t')$, and transmits the added signals to the terminal 203 through the cable bundle 300.

That is, the final signal ($F_C(t')$) transmitted to the terminal 203 from the concentration device C (103) through the cable bundle 300 is as follows.

$$F_C(t')=S_B(t')+S_A(t')*(-\alpha(t'))+S_B(t')*(-\beta(t'))$$

As described, in an exemplary embodiment of the present disclosure, the interference in the cable bundle 300 may decrease by adding the quasi-interference signal for offsetting the interference signal that is generated when the signal transmitted through the cable bundle 300 is influenced by another signal to the original signal and transmitting the same.

Figure 3:
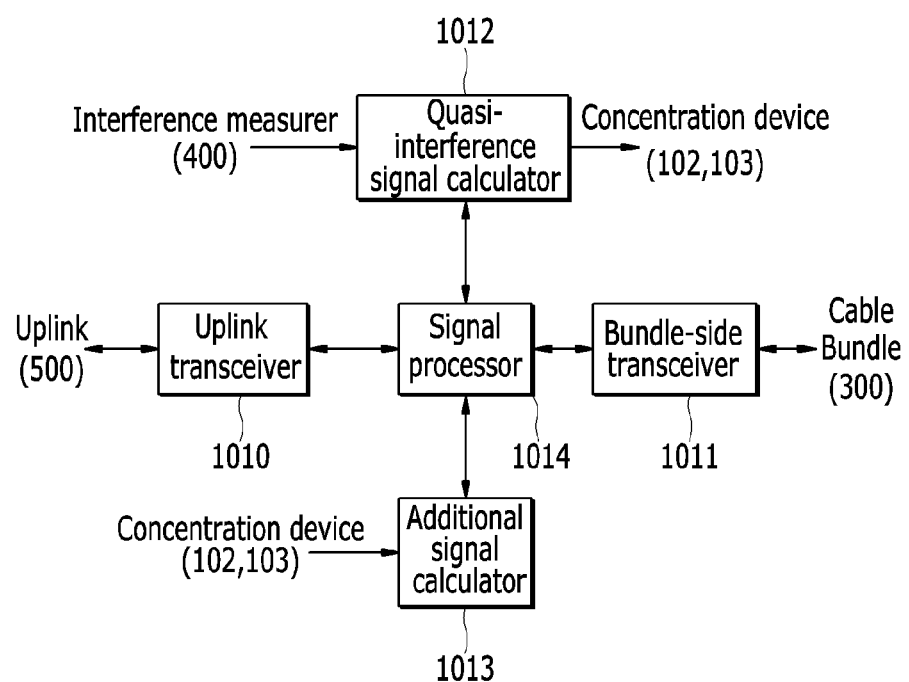
FIG. 3 shows a detailed configuration of a concentration device shown in FIG. 2.

FIG. 3 shows a detailed configuration of the concentration devices 101, 102, and 103 shown in FIG. 2. Here, the concentration devices 101, 102, and 103 have the same configuration so one concentration device 101 will be described for ease of description.

As shown in FIG. 3, the concentration device 101 includes an uplink transceiver 1010, a bundle-side transceiver 1011, a quasi-interference signal calculator 1012, an additional signal calculator 1013, and a signal processor 1014.

The uplink transceiver 1010 accesses the uplink 500 to transmit signals to and receive the same from the uplink 500.

The bundle-side transceiver 1011 accesses the cable bundle 300 to transmit signals to and receive the same from the terminal 201.

The quasi-interference signal calculator 1012 uses the interference coefficient $-\alpha(t')$ transmitted by the interference measurer 400 and the original signal $S_A(t')$ transmitted through the signal processor 1014 to calculate the quasi-interference signal $S_A(t')*(-\alpha(t'))$ and transmits the same to the concentration devices 102 and 103.

The additional signal calculator 1013 receives the quasi-interference signals $S_B(t')*(-\beta(t'))$ and $S_C(t')*(-\gamma(t'))$ from the concentration devices 102 and 103 and calculates the additional signal $XTALK3=S_B(t')*(-\beta(t'))+S_C(t')*(-\gamma(t'))$.

The signal processor 1014 adds the additional signal (XTALK3) calculated and transmitted by the additional signal calculator 1013 to the original signal $S_A(t')$ received through the uplink transceiver 1010 to generate the final signal $F_A(t')=S_A(t')+S_B(t')*(-\beta(t'))+S_C(t')*(-\gamma(t'))$ and transmits the same to the cable bundle 300 through the bundle-side transceiver 1011. The signal received from the cable bundle 300 through the bundle-side transceiver 1011 is transmitted to the uplink 500 through the uplink transceiver 1010.

Figure 4:
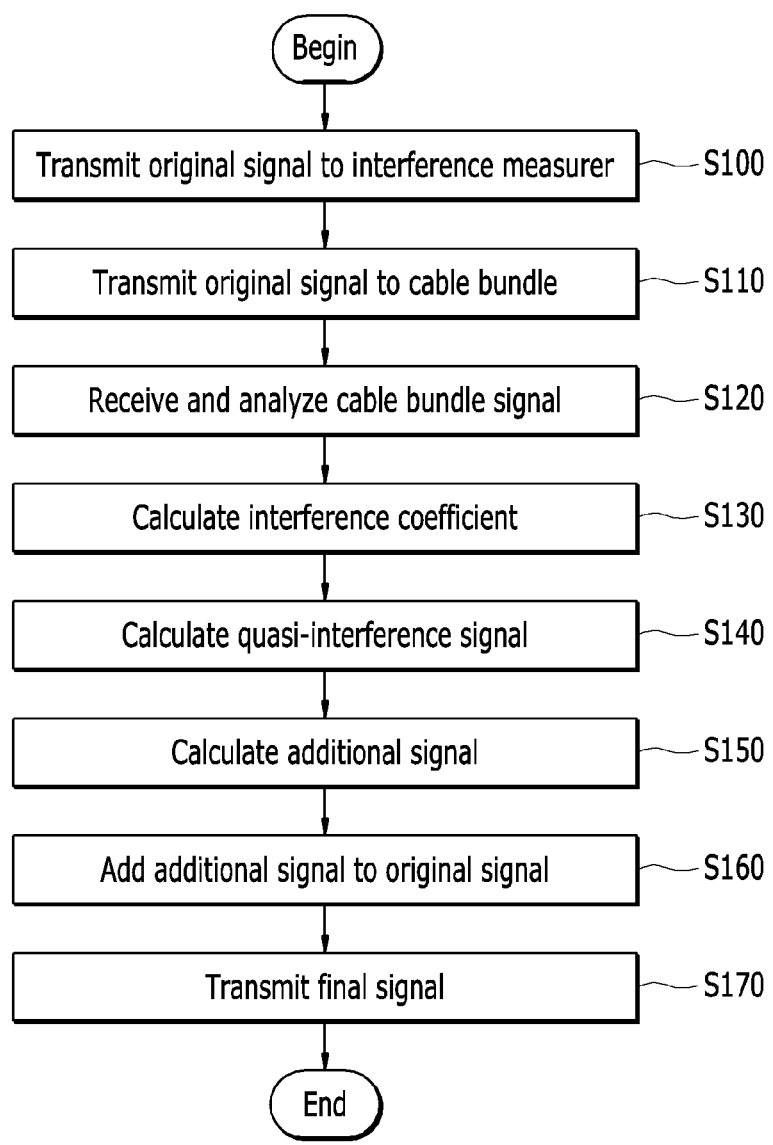
FIG. 4 shows a flowchart of a method for decreasing interference in a cable bundle according to a method shown in FIG. 2.

FIG. 4 shows a flowchart of a method for decreasing interference in a cable bundle according to a method shown in FIG. 2.

Referring to FIG. 4, the concentration devices A (101), B (102), and C (103) transmit the original signals $S_A(t')$, $S_B(t')$, and $S_C(t')$ to the interference measurer 400 (S100) and transmit the original signals $S_A(t')$, $S_B(t')$, and $S_C(t')$ to the terminals 201, 202, and 203 through the cable bundle 300 (S110).

The interference measurer 400 receives the signal transmitted through the cable bundle 300 to measure a channel, compares the same with the original signals $S_A(t')$, $S_B(t')$, and $S_C(t')$, analyzes them (S120) to analyze the interference signal, calculates interference coefficients $-\alpha(t')$, $-\beta(t')$, and $-\gamma(t')$ for generating the quasi-interference signal, and transmits the same to the concentration devices A (101), B (102), and C (103) (S130).

The concentration devices A (101), B (102), and C (103) use the interference coefficients $-\alpha(t')$, $-\beta(t')$, and $-\gamma(t')$ respectively to generate quasi-interference signals (S140), calculate additional signals XTALK1, XTALK2, and XTALK3 to be added to the original signals of the concentration devices A (101), B (102), and C (103) (S150), add the same to the original signals of the respective concentration devices A (101), B (102), and C (103) (S160), and transmit resultant signals to the terminals 201, 202, and 203 through the cable bundle 300 (S170).

Another example of a method for decreasing interference in a cable bundle according to an exemplary embodiment of the present disclosure will now be described.

Figure 5:
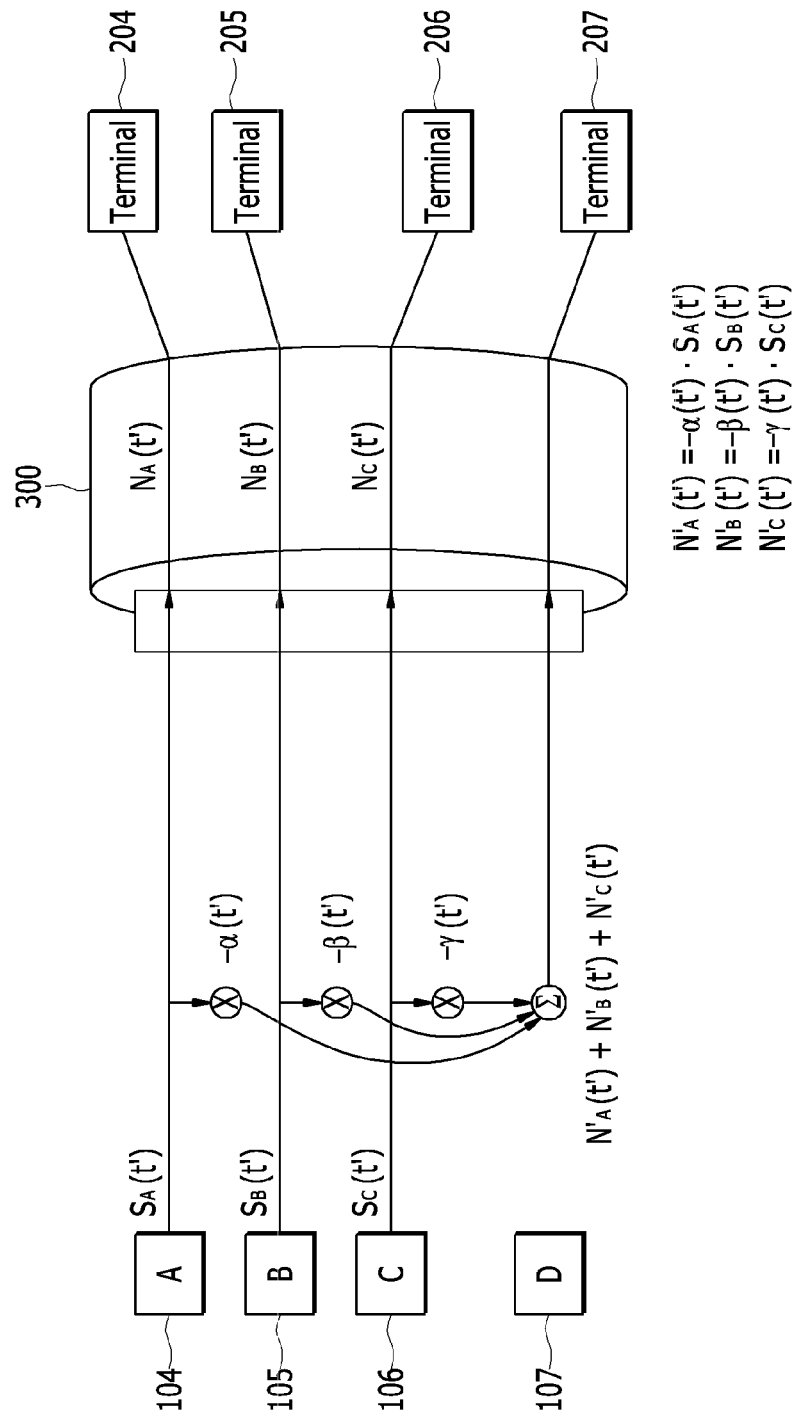
FIG. 5 shows another example of a method for decreasing interference in a cable bundle according to an exemplary embodiment of the present disclosure.

FIG. 5 shows another example of a method for decreasing interference in a cable bundle according to an exemplary embodiment of the present disclosure.

Referring to FIG. 5, for ease of description, the method will be described with a communication environment including four concentration devices, A (104), B (105), C (106), and D (107) and four terminals (204, 205, 206, and 207) connected through the cable bundle 300.

When the original signals transmitted to the terminals 204, 205, and 206 from the concentration devices A (104), B (105), and C (106) are $S_A(t')$, $S_B(t')$, and $S_C(t')$, and the original signals are transmitted through the cable bundle 300, the interference coefficients measured and calculated by the interference measurer 400 are $-\alpha(t')$, $-\beta(t')$, and $-\gamma(t')$. Here, the concentration device D (107) may be an unused concentration device that does not transmit signals or may be an additionally supplied concentration device for the method for decreasing interference in a cable bundle according to an exemplary embodiment of the present disclosure.

Therefore, the quasi-interference signal for the concentration device A (104) represents a signal of the product of the original signal and $-\alpha(t')$, the quasi-interference signal for the concentration device B (105) represents a signal of the product of the original signal and $-\beta(t')$, and the quasi-interference signal for the concentration device C (106) represents a signal of the product of the original signal and $-\gamma(t')$.

That is, the concentration device A (104) calculates a signal of the product of the original signal of the concentration device A (104) and the interference coefficient $-\alpha(t')$ and transmits the signal to the concentration device D (107), the concentration device B (105) calculates a signal of the product of the original signal of the concentration device B (105) and the interference coefficient $-\beta(t')$ and transmits the signal to the concentration device D (107), and the concentration device C (106) calculates a signal of the product of the original signal of the concentration device C (106) and the interference coefficient $-\gamma(t')$ and transmits the signal to the concentration device D (107).

Therefore, the concentration device D (107) receives the respective quasi-interference signals from the concentration devices A (104), B (105), and C (106), adds the same, and transmits the added signals to the terminal 207 through the cable bundle 300. In this instance, when the terminal 207 is not a terminal for substantially receiving the signal or is a terminal for receiving the same, it is assumed that the corresponding signal is not transmitted to the terminal.

For example, in FIG. 5, assuming that the concentration devices A (104), B (105), and C (106) transmit the same original signals $S_A(t')$, $S_B(t')$, and $S_C(t')$, the concentration device A (104) i) calculates a quasi-interference signal $S_A(t')*(-\alpha(t'))$ that is a signal of the product of the original signal $S_A(t')$ and the interference coefficient $-\alpha(t')$ and ii) transmits the same to the concentration device D (107).

The concentration device B (105) i) calculates a quasi-interference signal $S_B(t')*(-\beta(t'))$ that is a signal of the product of the original signal $S_B(t')$ and the interference coefficient $-\beta(t')$ and ii) transmits the same to the concentration device D (107).

In a like manner, the concentration device C (106) i) calculates a quasi-interference signal $S_C(t')*(-\gamma(t'))$ that is a signal of the product of the original signal $S_C(t')$ and the interference coefficient $-\gamma(t')$ and ii) transmits the same to the concentration device D (107).

As described, the quasi-interference signals transmitted to the concentration device D (107) may be added, and the final signal ($F_D(t')$) expressed below may be transmitted through the cable bundle 300.

$$F_D(t')=S_A(t')*(-\alpha(t'))+S_B(t')*(-\beta(t'))+S_C(t')*(-\gamma(t'))$$

As described, in an exemplary embodiment of the present disclosure, the interference signal generated in the original signal is offset and the interference in the cable bundle 300 may decrease by transmitting the quasi-interference signal for offsetting the interference signal that is generated when the signal transmitted through the cable bundle 300 is influenced by another signal through an additional line.

Figure 6:
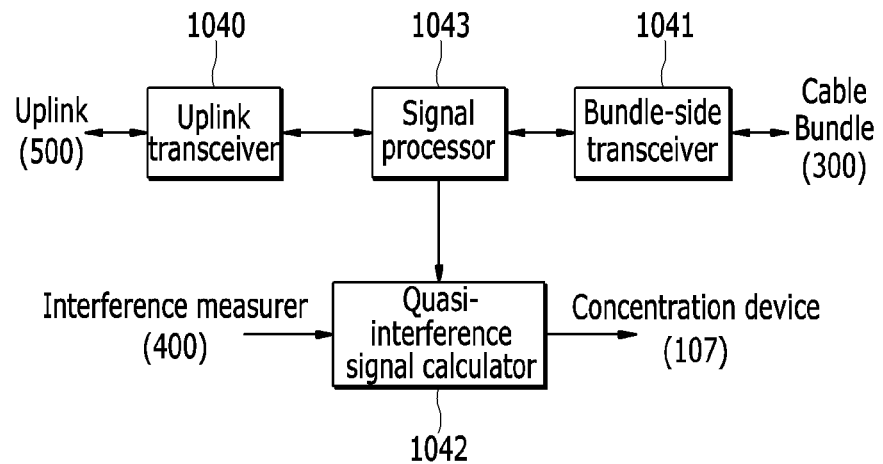
FIG. 6 shows a detailed configuration of concentration devices shown in FIG. 5.

FIG. 6 shows a detailed configuration of the concentration devices 104, 105, and 106 shown in FIG. 5. Here, the concentration devices 104, 105, and 106 have the same configuration so one concentration device 104 will be described for ease of description.

As shown in FIG. 6, the concentration device 104 includes an uplink transceiver 1040, a bundle-side transceiver 1041, a quasi-interference signal calculator 1042, and a signal processor 1043.

The uplink transceiver 1040 accesses the uplink 500 to transmit signals to the uplink 500 and receive the same from the uplink 500.

The bundle-side transceiver 1041 accesses the cable bundle 300 to transmit signals to the terminal 204 and receive the same from the terminal 204.

The quasi-interference signal calculator 1042 uses the interference coefficient $-\alpha(t')$ transmitted by the interference measurer 400 and the original signal $S_A(t')$ transmitted through the signal processor 1043 to calculate the quasi-interference signal $S_A(t')*(-\alpha(t'))$ and transmit the same to the concentration device 107.

The signal processor 1043 transmits the original signal $S_A(t')$ received through the uplink transceiver 1040 to the cable bundle 300 through the bundle-side transceiver 1041. The signal received from the cable bundle 300 through the bundle-side transceiver 1041 is transmitted to the uplink 500 through the uplink transceiver 1040.

Figure 7:
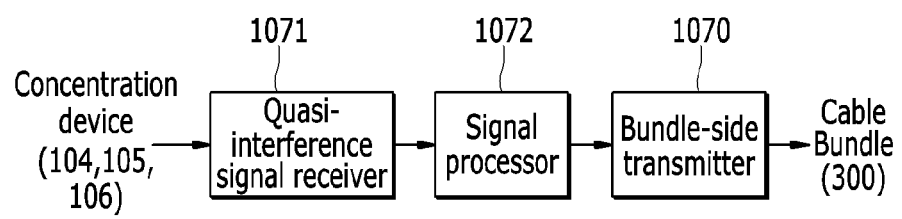
FIG. 7 shows a detailed configuration of a concentration device shown in FIG. 5.

FIG. 7 shows a detailed configuration of a concentration device 107 shown in FIG. 5.

As shown in FIG. 7, the concentration device 107 includes a bundle-side transmitter 1070, a quasi-interference signal receiver 1071, and a signal processor 1072.

The bundle-side transmitter 1070 transmits signals to the cable bundle 300.

The quasi-interference signal receiver 1071 receives quasi-interference signals $S_A(t')*(-\alpha(t'))$, $S_B(t')*(-\beta(t'))$, and $S_C(t')*(-\gamma(t'))$ from the concentration devices 104, 105, and 106.

The signal processor 1072 transmits the final signal $F_D(t')=S_A(t')*(-\alpha(t'))+S_B(t')*(-\beta(t'))+S_C(t')*(-\gamma(t'))$ that is generated by adding the quasi-interference signals received through the quasi-interference signal receiver 1071 to the cable bundle 300 through the bundle-side transmitter 1070.

Figure 8:
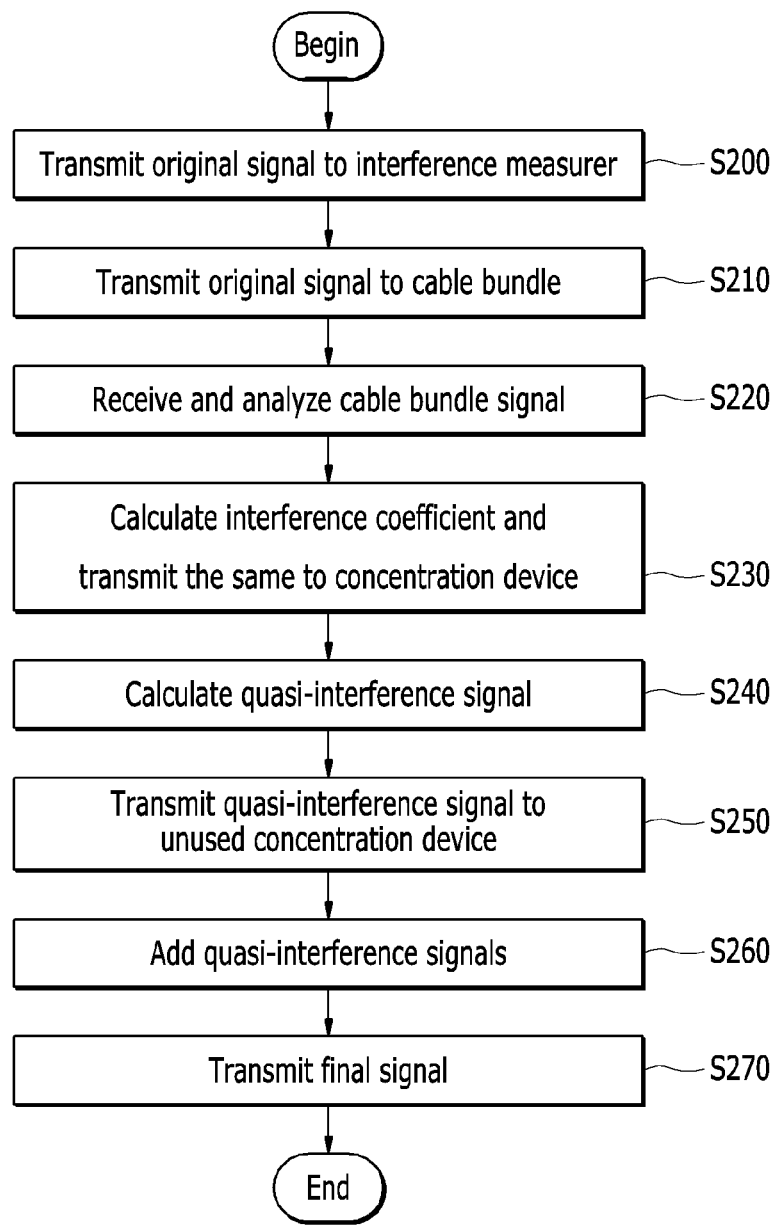
FIG. 8 shows a flowchart of a method for decreasing interference in a cable bundle according to a method shown in FIG. 5.

FIG. 8 shows a flowchart of a method for decreasing interference in a cable bundle according to a method shown in FIG. 5.

Referring to FIG. 8, the concentration devices A (104), B (105), and C (106) i) transmit the original signals $S_A(t')$, $S_B(t')$, and $S_C(t')$ to the interference measurer 400 (S200) and ii) transmit the original signals $S_A(t')$, $S_B(t')$, and $S_C(t')$ (S210) to the terminal s204, 205, and 206 through the cable bundle 300.

The interference measurer 400 receives the signal transmitted through the cable bundle 300 to measure a channel, compares the same with the original signals $S_A(t')$, $S_B(t')$, and $S_C(t')$, analyzes them (S220) to analyze the interference signal, calculates interference coefficients $-\alpha(t')$, $-\beta(t')$, and $-\gamma(t')$ for generating the quasi-interference signal, and transmits the same to the concentration devices A (104), B (105), and C (106) (S230).

The concentration devices A (104), B (105), and C (106) use the interference coefficients $-\alpha(t')$, $-\beta(t')$, and $-\gamma(t')$ respectively to generate quasi-interference signals (S240) and transmit the generated quasi-interference signals to the concentration device D (107) (S250).

Therefore, the concentration device D (107) adds the quasi-interference signals transmitted by the concentration devices A (104), B (105), and C (106) (S260) and transmits the added signals to the cable bundle 300 (S270).

It has been described that, in order to offset the interference signal occurring in the cable bundle 300, the interference coefficient measured by the interference measurer 400 is used, and the respective concentration devices 101, 102, 103, 104, 105, and 106 calculate quasi-interference signals and add the quasi-interference signals to the original signals or transmit them through an additional transmission line, but the technical range of the present disclosure is not restricted thereto, such that interference coefficients for the respective concentration devices 101, 102, 103, 104, 105, and 106 are received from the interference measurer 400 and original signals are received from the concentration devices 101, 102, 103, 104, 105, and 106 to calculate quasi-interference signals, and additional signals are calculated based on the quasi-interference signals so that the concentration devices 101, 102, 103, 104, 105, and 107 may transmit signals.

Figure 9:
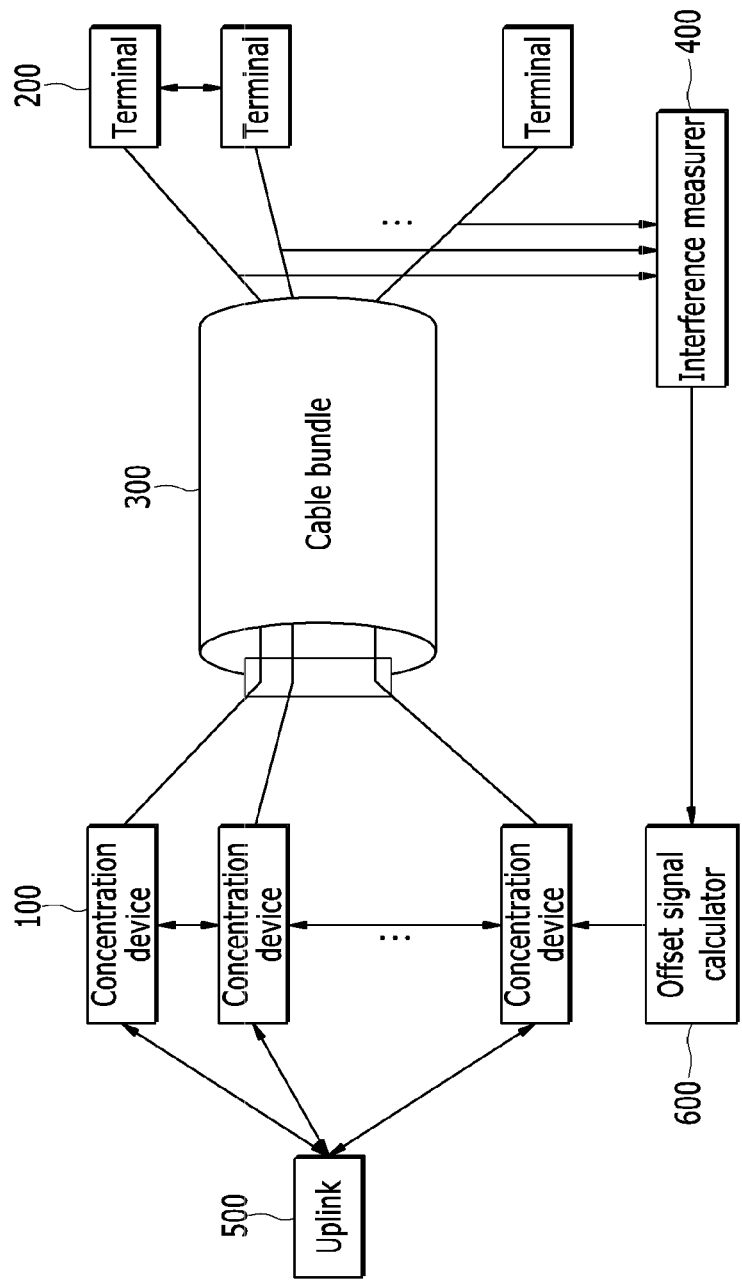
FIG. 9 shows a device for decreasing interference in a cable bundle according to another exemplary embodiment of the present disclosure.

For example, referring to FIG. 9, an offset signal calculator 600 is independently provided to an additional system or one of the concentration devices 101, 102, 103, 104, 105, and 106, and the offset signal calculator 600 uses the interference coefficient provided by the interference measurer 400 and the original signals provided by the concentration devices 101, 102, 103, 104, 105, and 106 to generate quasi-interference signals and calculate an additional signal to be added to the original signal or an offset signal to be transmitted through an additional transmission line. The calculated additional signal may be transmitted to the concentration devices 101, 102, and 103 to be added to the original signal and transmitted to the cable bundle 300 or it may be transmitted to the concentration device 107 to be transmitted to the cable bundle 300 through an additional transmission line and thereby offset the interference signal to be generated in the cable bundle 300.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for decreasing interference, comprising:
   a plurality of concentration devices connected to a cable bundle having a plurality of cables and configured to provide a network service to a plurality of terminals respectively connected to the plurality of concentration devices through corresponding cables of the cable bundle in an access section; and
   an interference measurer connected between the cable bundle and the plurality of terminals and configured to measure interference signals occurring between original signals by measuring signals respectively transmitted, through the corresponding cables of the cable bundle, from the plurality of concentration devices to the terminals, calculate interference coefficients, and transmit the interference coefficients respectively to the concentration devices,
   wherein one of the concentration devices is configured to receive a signal from the uplink, receive a corresponding interference coefficient from the interference measurer, generate one quasi-interference signal by applying the received corresponding interference coefficient to the received signal, and transmit the generated one quasi-interference signal to the other concentration devices, and wherein the one of the concentration device is configured to receive other quasi-interference signals from the other concentration devices, receive a transmission signal from the uplink, generate a final signal by adding the transmission signal and the other quasi-interference signals, and transmit the final signal to a corresponding terminal through the cable bundle.

2. The device of claim 1, wherein:

the plurality of concentration devices include a first concentration device, a second concentration device, and a third concentration device; and the first concentration device is configured to:

i) receive a first interference coefficient from the intereference measurer, ii) receive a signal from the uplink, iii) calculate a first quasi-interference signal by multiplying received signal and the first interference coefficient, and iv) transmit the calculated first quasi-interference signal to the second concentration device and the third concentration device; and the first concentration device is configured to:

a) receive a first transmission signal from the uplink, b) receive a second quasi-interference signal from the second concentration device and a third quasi-interference signal from the third concentration device, c) generate a first additional signal by adding the second quasi-interference signal and the third quasi-interference signal, d) generating a final signal by adding the first transmission signal and the first additional signal, and e) transmitting the final signal to a corresponding terminal through the cable bundle.

3. The device of claim 1, wherein each of the plurality of concentration devices includes:

a quasi-interference signal calculator configured to calculate the one quasi-interference signal by multiplying a signal from the uplink by a corresponding one of the interference coefficients from the interference measurer and transmit the calculated quasi interference signal to the other concentration devices;

an additional signal calculator configured to calculate an additional signal by using the other quasi-interference signals generated by and transmitted from the other concentration devices; and a signal processor configured to generate a final signal by adding the additional signal to the signal from the uplink and transmit the final signal to a corresponding terminal through the cable bundle.

4. The device of claim 3, wherein the additional signal calculator is configured to add the other quasi-interference signals from the other concentration devices in order to calculate the additional signal.

5. The device of claim 3, wherein the additional signal is phase-inverted from the signal from the uplink by about 180 degrees.

6. A method for decreasing, by one concentration device among a plurality of concentration devices coupled to a cable bundle, interference in the cable bundle, comprising:

receiving a corresponding interference coefficient, wherein the corresponding interference coefficient is calculated by measuring an interference signal generated between signals based on signals transmitted from the plurality of concentration devices to terminals through the cable bundle, calculating interference coefficients respectively for the plurality of concentration devices, and transmitting the interference coefficients respectively to the plurality of concentration devices;

calculating, by the one concentration device, one quasi-interference signal by using the received corresponding interference coefficient with an original signal to be transmitted to a corresponding terminal; and transmitting the calculated one quasi-interference signal to the other concentration devices coupled to the cable bundle.

7. The method of claim 6, further comprising:

receiving the other quasi-interference signals from the other concentration devices;

calculating an additional signal by adding the other quasi-interference signals;

generating a final signal by adding a transmission signal from the uplink and the calculated additional signal; and transmitting the final signal to a corresponding terminal through the cable bundle.

* * * * *